US008113659B2

(12) United States Patent
Olson

(10) Patent No.: US 8,113,659 B2
(45) Date of Patent: Feb. 14, 2012

(54) VISUAL FILM IDENTIFICATION

(75) Inventor: Robert Arthur Olson, Moorpark, CA (US)

(73) Assignee: Thomas Licensing, Boulogne-Billancourt (FR)

( * ) Notice: Subject to any disclaimer, the term of this patent is extended or adjusted under 35 U.S.C. 154(b) by 607 days.

(21) Appl. No.: 12/083,528

(22) PCT Filed: Jun. 16, 2006

(86) PCT No.: PCT/US2006/023491

§ 371 (c)(1), (2), (4) Date: Apr. 14, 2008

(87) PCT Pub. No.: WO2007/055747

PCT Pub. Date: May 18, 2007

(65) Prior Publication Data

US 2009/0231547 A1 Sep. 17, 2009

Related U.S. Application Data

(60) Provisional application No. 60/732,627, filed on Nov. 2, 2005.

(51) Int. Cl.
*G03B 41/00* (2006.01)

(52) U.S. Cl. ........ 352/236; 352/56; 352/130; 346/107.1

(58) Field of Classification Search .................. 352/236, 352/56, 130; 346/107.1
See application file for complete search history.

(56) References Cited

U.S. PATENT DOCUMENTS

| | | | | |
|---|---|---|---|---|
| 4,554,560 | A | 11/1985 | Kanaoka et al. | |
| 4,673,266 | A * | 6/1987 | Fiumi | 352/90 |
| 5,229,810 | A * | 7/1993 | Cloutier et al. | 355/40 |
| 5,532,773 | A * | 7/1996 | Shaw et al. | 353/26 A |
| 5,745,213 | A * | 4/1998 | Goodhill et al. | 352/27 |
| 6,556,273 | B1 * | 4/2003 | Wheeler et al. | 352/92 |
| 7,403,708 | B2 * | 7/2008 | Stwertka et al. | 396/310 |
| 2003/0011746 | A1 | 1/2003 | Goodhill et al. | |
| 2004/0057015 | A1 | 3/2004 | Goodhill et al. | |
| 2005/0036113 | A1 | 2/2005 | Goodhill et al. | |
| 2005/0053235 | A1 | 3/2005 | Clark et al. | |
| 2006/0017884 | A1 | 1/2006 | Goodhill et al. | |

FOREIGN PATENT DOCUMENTS

| | | |
|---|---|---|
| GB | 2337130 | 11/1999 |
| JP | 07219078 | 8/1995 |
| JP | 07219087 | 8/1995 |
| JP | 07253625 | 10/1995 |
| JP | 2003514254 | 4/2003 |
| WO | WO0135163 | 5/2001 |

OTHER PUBLICATIONS

Mosely. J.: "Computerized Tracing of Magnetically Striped Theatrical Release Prints," SMPTE Tutorial Paper. SMPTE Journal 93, Nov. 1984, pp. 1057-1061.

(Continued)

*Primary Examiner* — William C Dowling
(74) *Attorney, Agent, or Firm* — Robert D. Shedd; Robert B. Levy; Jeffrey D. Hale

(57) ABSTRACT

A method for identifying film includes locating a visual identifier proximally to perforations on a film length. Preferably, the visual identifier is located between perforations on the film proximal to an edge distal from a soundtrack on the film.

9 Claims, 1 Drawing Sheet

OTHER PUBLICATIONS

"SMPTE Recommended Practice RP 152-1994 Edge Indentification of Leader and Picture for 35-mm Release Prints", SMPTE Standards, Recommended Practices, Engineering Guidelines and Registered Disclosures Documents, 1994, pp. 1-2, XP009082881, White Plains, NY, US.

"SMPTE Standard ANSI/SMPTE 254-1992 for Motion-Picture Film (35mm) Manufacturer—Printed, Latent Image Indentification Information," SMPTE Journal, vol. 101, No. 10, Oct. 1992, pp. 740-743, XP000321738, White Plains, NY, US.

International Search Report Dated May 7, 2007.

* cited by examiner

VISUAL FILM IDENTIFICATION

This application claims the benefit, under 35 U.S.C. §365 of International Application PCT/US2006/023491, filed Jun. 16, 2006, which was published in accordance with PCT Article 21(2) on May 18, 2007, in English and which claims the benefit of U.S. provisional patent application No. 60/732,627, filed Nov. 2, 2005.

FIELD OF THE INVENTION

The present invention relates generally to a visual identification of a film, and in particular, to a numbering method that imprints the reel number onto a motion picture film print to facilitate identification of the film segment in the event the identifying leaders on the reel are removed.

BACKGROUND OF THE INVENTION

Presently, most full length movies are printed or exposed on motion picture film stock. A typical full length motion picture film can run as long as 7,500 to 10,000 feet of film stock. The average size of present day motion picture film reels can only accommodate an amount of film much smaller than the entire motion picture film, for example, 1500 to 3000 feet. Therefore, the average motion picture film print released for distribution will comprise 3, 4 or more film reels. While each reel will typically contain some type of visual marking to identify its relation to the other reels, for example, reel 3 of 5 or reel 4 of 6, the film carried by such a reel typically carries no such identification. As a result, if the marking on the reel becomes unreadable, those handling the film, say the manufacturer or the theater operator, will have difficulty in visually determining the relationship of a film reel to other film reels of the same movie. Accordingly, there is a need for visually identifying film reels relative to one another.

Some film manufacturers have attempted to resolve the identification issues by marking a small portion (e.g., the first few feet) of the beginning of the film. This was done to identify the film but at a high cost and, thus, was limited to a very short segment of the film that could be easily marked. However, as the film is used, these types of markings generally prove insufficient. Repeated threadings of the film can weaken the initial sections of the film causing breaks that can eliminate the marked sections of film over time. Additionally, if the film should break in the middle, the person splicing the film has no means to easily determine if a spliced section belongs to that particular film reel or not. Thus, it is desirable to have a cost efficient means to allow identification of reels in any situation that may arise.

SUMMARY OF THE INVENTION

An inventive method for identifying film includes locating a visual identifier proximally to perforations on a film length. Preferably, the visual identifier is located between perforations on the film proximal to an edge distal from a soundtrack on the film.

In an alternative embodiment of the invention, a method for identifying film includes advancing a film length of a motion picture and locating a visual identifier relative to perforations on the advancing film length. Preferably, the visual identifier is imprinted between the perforations on the film length.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The invention provides a visual identification for segments of a motion picture film to aid in reducing the occurrence of mixed reels or film segments at production, distribution, shipping and receiving facilities. In an exemplary embodiment, a reel numbering is employed by putting a film segment identifying number between film perforations along the films edge. A laser array device can be used to imprint the reel number between the perforations on the non-soundtrack side of print film. The imprinting of the number is preferably exposing the number on the film between the perforations along the edge. Thus, as the film undergoes printing, different sections of the film will bear different reel number markings corresponding to the particular reel that will carry that particular film length. Further, the laser array could potentially imprint the feature title as well as the reel number in this area.

Figure 1:
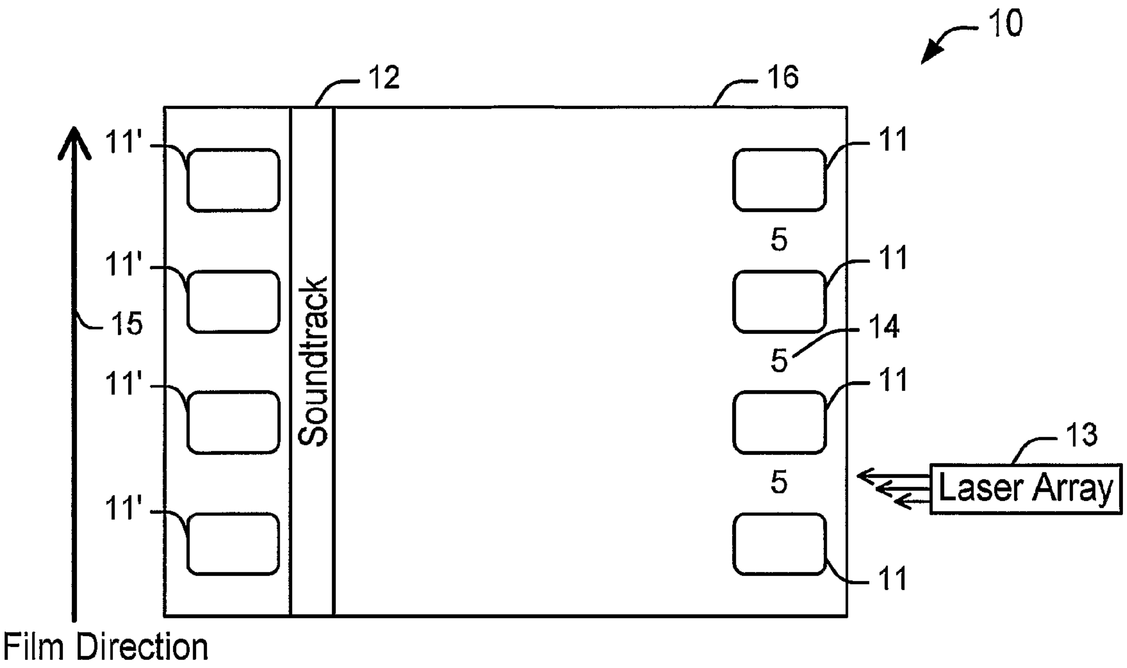
FIG. 1 shows a film length illustrating a film numbering system in accordance with the invention.

Referring to FIG. 1, there is shown a section of an exemplary motion picture film 10 with perforations 11 and 11' along the sides of its length, a soundtrack region 12 and film's video frame area 16. An identification of a reel 14 is imprinted in the form of a number 5 between perforations opposite the soundtrack side of the film. A typical printing apparatus (not shown) can comprise a laser 13 for marking the film with a reel number or similar such marking, as the film travels during the manufacturing process. A frame counter or similar mechanism could determine the length of film traveling past the laser 13 and enable changes in the reel numbering from film segment to film segment. A control apparatus, such as a computer or logic circuit could monitor the frame counter and control the laser to increment the reel number inscribed by the laser once a certain length of film had passed, corresponding to the amount of film held on a film reel. As the film count reached the end of the first film length, and the second film length, the reel numbering could change from the number 1 to number 2, as an example, or some other visual indication of the sequence relationship between film segments relationship.

Figure 2:
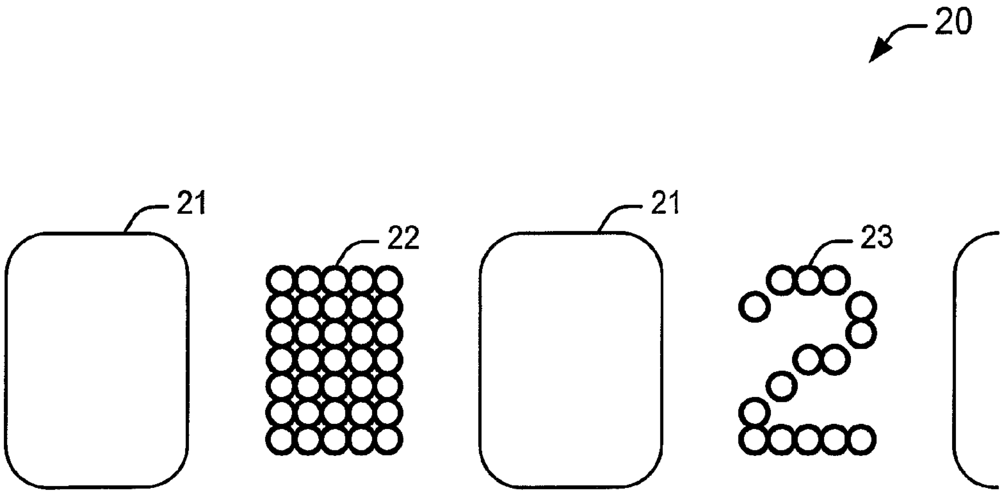
FIG. 2 shows alternative visual markings of film in accordance with the invention.

Referring to FIG. 2, there are shown alternative embodiments 20 of visual identifications between the perforations 21 along the film edge. The film length can be imprinted with a numeral designation 23 or a pattern of dots 22. The matrix pattern of dots 22 is merely exemplary to show that a various number of visual identifications can be imprinted on the film length.

Having described preferred embodiment for the inventive film numbering method, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method for identifying film comprising the steps of:

counting frames of a film as the film advances;

continuously marking an entire segment of the film with a first visual identifier, the marking proximally located to perforations on the film; and changing to a second visual identifier when the frame counting indicates an end of a film segment.

2. The method of claim 1 further comprising:

locating the visual identifier between perforations on the film proximal to an edge distal from a soundtrack on the film.

3. The method of claim 1 further comprising:

continuously marking by imprinting a number.

4. The method of claim 1 further comprising:

continuously marking by imprinting a pattern.

5. The method of claim 4 further comprising:

continuously marking by exposing the visual identifier on the film.

6. The method of claim 1 further comprising:

utilizing perforations that are distal from a soundtrack on the film.

7. The method of claim 1 further comprising:

continuously marking by laser imprinting the visual identifier.

8. The method of claim 1 further comprising:

continuously marking by laser imprinting a number between perforations on the film.

9. Media for recording visual or audio information that incorporates continuous markings on its entire length with a visual identifier proximally located on an edge of the media according to claim 1, the visual identifier differentiating between separate segments of the media.

* * * * *